United States Patent
Vu

(10) Patent No.: US 7,751,806 B1
(45) Date of Patent: Jul. 6, 2010

(54) SYSTEM AND METHOD FOR MONITORING DISPATCH COMMUNICATIONS

(75) Inventor: Trinh D. Vu, Ashburn, VA (US)

(73) Assignee: Nextel Communications Inc., Reston, VA (US)

( * ) Notice: Subject to any disclaimer, the term of this patent is extended or adjusted under 35 U.S.C. 154(b) by 830 days.

(21) Appl. No.: 11/295,629

(22) Filed: Dec. 7, 2005

(51) Int. Cl.
*H04M 3/42* (2006.01)
*H04B 7/00* (2006.01)

(52) U.S. Cl. .................. 455/418; 455/518; 455/521

(58) Field of Classification Search ......... 455/517–519, 455/418–420, 422.1, 415–416, 521; 370/296
See application file for complete search history.

(56) References Cited

U.S. PATENT DOCUMENTS

| | | | |
|---|---|---|---|
| 5,230,078 A * | 7/1993 | Varela et al. ............ 455/67.11 |
| 5,423,061 A * | 6/1995 | Fumarolo et al. ........... 455/519 |
| 5,933,780 A * | 8/1999 | Connor et al. .............. 455/519 |
| 6,650,908 B1 * | 11/2003 | Coombes et al. ............ 455/560 |
| 6,751,468 B1 * | 6/2004 | Heubel et al. ............... 455/518 |
| 6,754,468 B1 * | 6/2004 | Sieben et al. ............... 455/41.2 |
| 6,792,281 B2 * | 9/2004 | Upp et al. ................... 455/519 |
| 6,895,254 B2 * | 5/2005 | Dorenbosch ............... 455/518 |
| 7,203,509 B2 * | 4/2007 | Gottschalk et al. .......... 455/518 |
| 7,483,708 B2 * | 1/2009 | Maggenti .................... 455/518 |
| 2004/0002351 A1 | 1/2004 | Upp et al. |

\* cited by examiner

*Primary Examiner*—George Eng
*Assistant Examiner*—Brandon J Miller

(57) ABSTRACT

Systems and methods for monitoring dispatch communications are provided. A console receives signaling and/or media streams for two or more dispatch talk groups. The console alternatively outputs the two or more media streams. In response to a suspension command, the console will continue to output the current media stream, until a suspension cancel command has been received. The console will skip to a next media stream, out of a group of media streams, in response to receipt of a next media stream command.

21 Claims, 5 Drawing Sheets

SYSTEM AND METHOD FOR MONITORING DISPATCH COMMUNICATIONS

BACKGROUND OF THE INVENTION

The mobility afforded by wireless communication networks has resulted in increased usage of such networks. Wireless networks can be divided into private wireless networks and publicly-accessible wireless networks. Private wireless networks, also known as private trunking radio networks, are commonly operated by public safety agencies, taxi services and delivery services. A majority of private wireless networks provide only dispatch communication services, whereas a majority of publicly-accessible wireless networks provide only interconnect communication services. Dispatch communication services are sometimes referred to as "walkie-talkie" communication services because of the half-duplex nature of the communications. Interconnect communication services are what is typically referred to as circuit-switched voice communications.

Private wireless networks typically operate over a limited range of frequencies and within limited geographic areas. Additionally, private wireless networks typically operate using proprietary protocols, have limited expansion capabilities, are expensive to operate and cannot easily interoperate with other private or publicly-accessible wireless networks. In contrast, publicly-accessible wireless networks typically operate over a larger number of frequencies and provide coverage over larger geographic areas. Moreover, publicly-accessible wireless networks use standard protocols, are easier to expand, and interoperate with other publicly-accessible wireless networks.

Private wireless networks are typically preferred by public safety agencies because of the reliability of these networks in emergency situations compared to publicly-accessible wireless networks which can block calls during emergency situations. Public safety agencies are attracted to publicly-accessible wireless networks as a way to reduce the costs associated with operating and maintaining a private wireless network.

Due to the relative complexity of publicly-accessible wireless networks compared to private wireless networks, some of the features and functionalities provided in private wireless networks are not offered in publicly-accessible wireless networks. Specifically, private wireless networks typically have a single, centrally-located, communications processor (or call handler) for managing and routing communications between wireless stations. In contrast, publicly-accessible wireless networks have a distributed architecture, which involves routing communications between a number of communication processors.

SUMMARY OF THE INVENTION

Public safety agencies typically rely upon a dispatcher to monitor dispatch communications, and coordinate the communications and/or support. However, because public safety agencies typically operate private wireless networks, the dispatcher can only monitor dispatch communications for one particular agency. Moreover, because private wireless networks are limited to particular geographical coverage, the dispatcher can only monitor dispatch communications for the particular geographical coverage area. Accordingly, it would be desirable to provide systems and methods for a dispatcher to monitor dispatch communications, which occur between public safety agencies and/or over a broader geographic coverage area than that provided by private wireless networks.

The present invention provides a method for monitoring dispatch communications. A first media stream for a first dispatch talk group communication, and a second media stream for a second dispatch talk group communication, are received by a dispatch communication console. The dispatch communication console alternatively outputs the first and second media streams for a predetermined amount of time, such that the first and second media streams are alternatively output automatically. Two of the participants of the first or second dispatch talk group communications are supported by different dispatch call handlers.

The present invention also provides a dispatch console for monitoring dispatch communications. The dispatch console includes an interface which receives a first media stream for a first dispatch talk group communication, and a second media stream for a second dispatch talk group communication. The console also includes a processor which alternatively outputs the first and second media streams for a predetermined amount of time, wherein the processor automatically alternatively outputs the first and second media streams. Two of the participants of the first or second dispatch talk group communications are supported by different dispatch call handlers.

Other objects, advantages and novel features of the present invention will become apparent from the following detailed description of the invention when considered in conjunction with the accompanying drawings.

BRIEF DESCRIPTION OF THE DRAWING FIGURES

DETAILED DESCRIPTION OF THE PREFERRED EMBODIMENTS

Figure 1A:
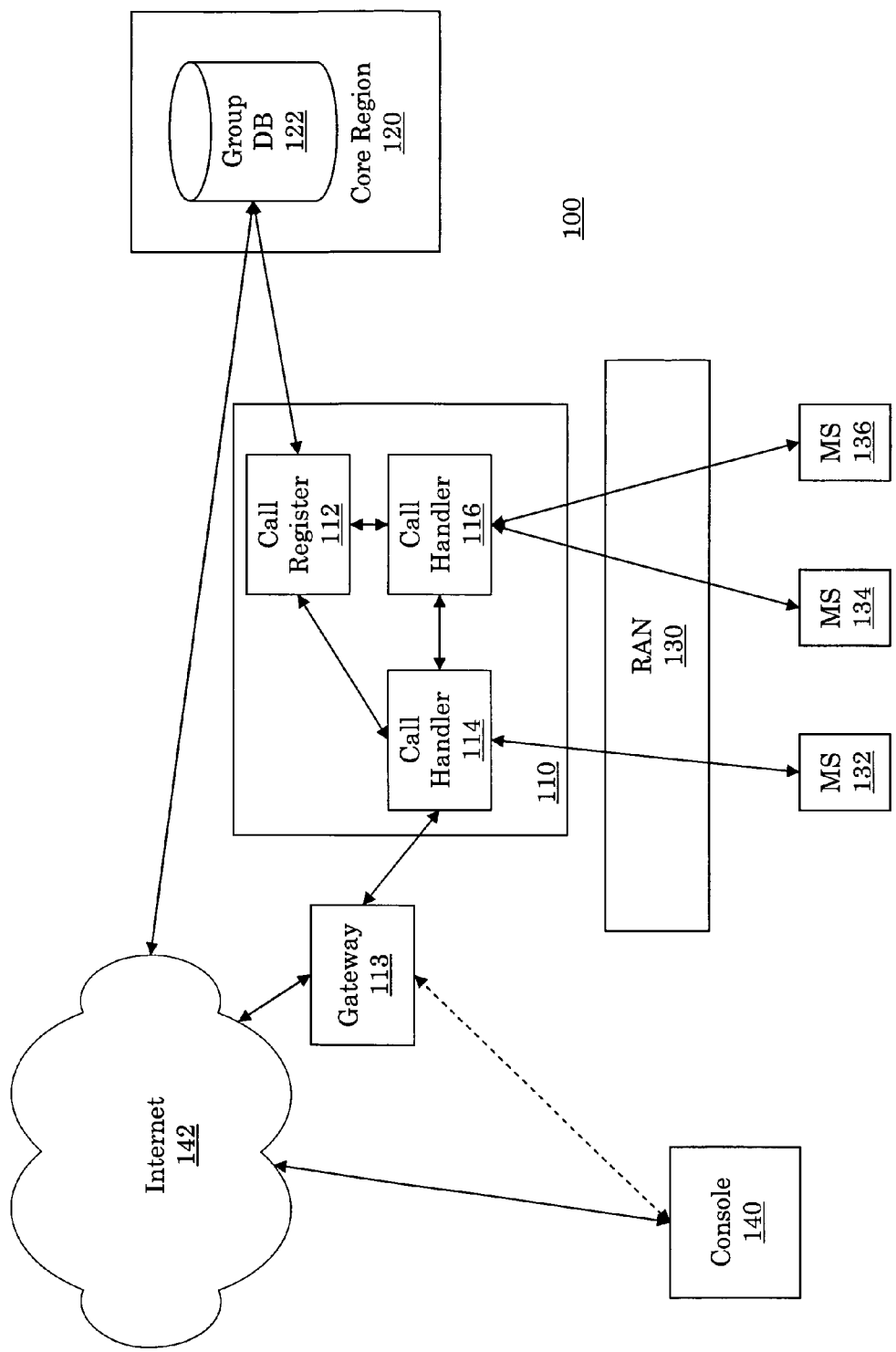
FIGS. 1A and 1B illustrate exemplary communication systems in accordance with the present invention.

FIG. 1A illustrates an exemplary system 100 for facilitating dispatcher monitoring of dispatch talk group communications in accordance with the present invention. The system includes a dispatch area network subsystem 110, a core region 120 and a radio access network (RAN) 130. A dispatch area is a geographic area which includes two or more cells that share network subsystems, such as mobile switching centers (MSC) and location registers. The dispatch area network subsystem 110 includes a call register 112, and first and second call handlers 114 and 116. The core region 120 includes a group database 122. The call register 112 generally operates in a similar manner to a location register and performs the functions of a home location register (HLR) to register and authenticate the user. Each of the first and second call handlers 114 and 116 generally operates in a similar manner to a mobile switching center/visitor location register (MSC/VLR) or a dispatch application processor (DAP). The first call handler 114 is illustrated as handling communications from mobile station 132, and the second call handler 116 is illustrated as handling communications from mobile stations 134 and 136.

A dispatcher, using console 140, can access the group database 122, via Internet 142. Alternatively, or additionally, the dispatcher can access the group database by connecting to gateway 113, without using Internet 142. Additionally, the dispatcher can receive dispatch talk group communications via gateway 113 (either directly or via Internet 142), which is coupled to call handler 114. For ease of explanation, and not limitation, FIG. 1A only illustrates call handler 114 being coupled to gateway 113. However, each call handler will be coupled to gateway 113, in order to allow the dispatch talk group communications to be forwarded to the console 140.

The console 140 can be a personal computer running a console software client or a dedicated console. When the console 140 is a personal computer running a console software client, the console 140 can use a web-based interface for accessing the user database 122. In this case, the console 140 uses an edge proxy (e.g., gateway 113) for registration with the network, acquiring dispatch service, (such as call setup, media transfer, in-call signaling and call termination), and to perform administrative functions with the group database 122. The console 140 discovers the dispatch network by using domain name service (DNS) to the edge proxy, and will obtain dispatch service after successful registration and authorization. The edge proxy, by controlling an opening in a firewall for the relevant traffic to the dispatch network, allows the console 140 to communicate with the dispatch network.

When the console 140 is a dedicated console, it can be coupled to gateway 113 without passing through the Internet. Because there can be a number of different consoles, which communicate using different signaling and media protocols, the gateway can provide signaling and media gateway functions to inter-work between the console protocols and the protocols of the dispatch network. Accordingly, when the console provides analog voice, the gateway can convert it into digital media, and vice versa. Alternatively, or additionally, the gateway 113 can convert between real-time protocol (RTP) media streams from the dispatch network and pulse code modulated (PCM) media streams from the consoles. In order to perform the various conversions discussed above, the gateway can include multiple protocol stacks to support media and signaling for particular consoles.

Figure 1B:
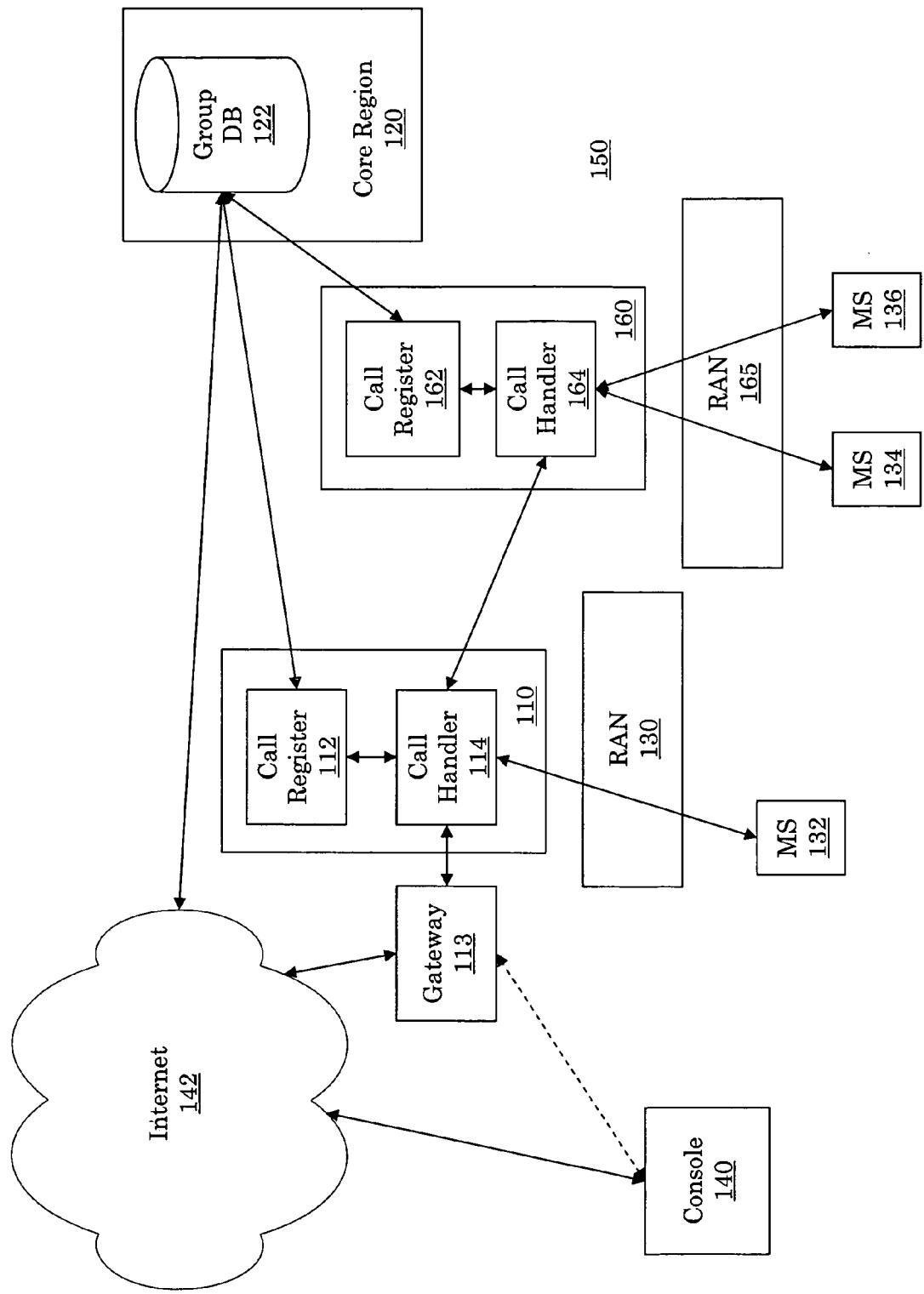

FIG. 1B illustrates a system in accordance with another embodiment of the present invention. The system illustrated in FIG. 1B is similar to the system illustrated in FIG. 1A, and hence, like elements include the same reference numbers. The difference between the systems of FIGS. 1A and 1B is that in FIG. 1A the first and second call handlers 114 and 116 are located in the same dispatch area network subsystem 110, whereas in FIG. 1B, the first and second call handlers are located in different dispatch area subsystems 110 and 160. Because the second call handler 164 is located in a different dispatch area subsystem than the first call handler 114, the second call handler uses a different call register and RAN, i.e., call register 162 and RAN 165.

The operation of the systems illustrated in FIGS. 1A and 1B will be described in more detail below, in connection with the methods illustrated in FIGS. 3 and 4

Figure 2:
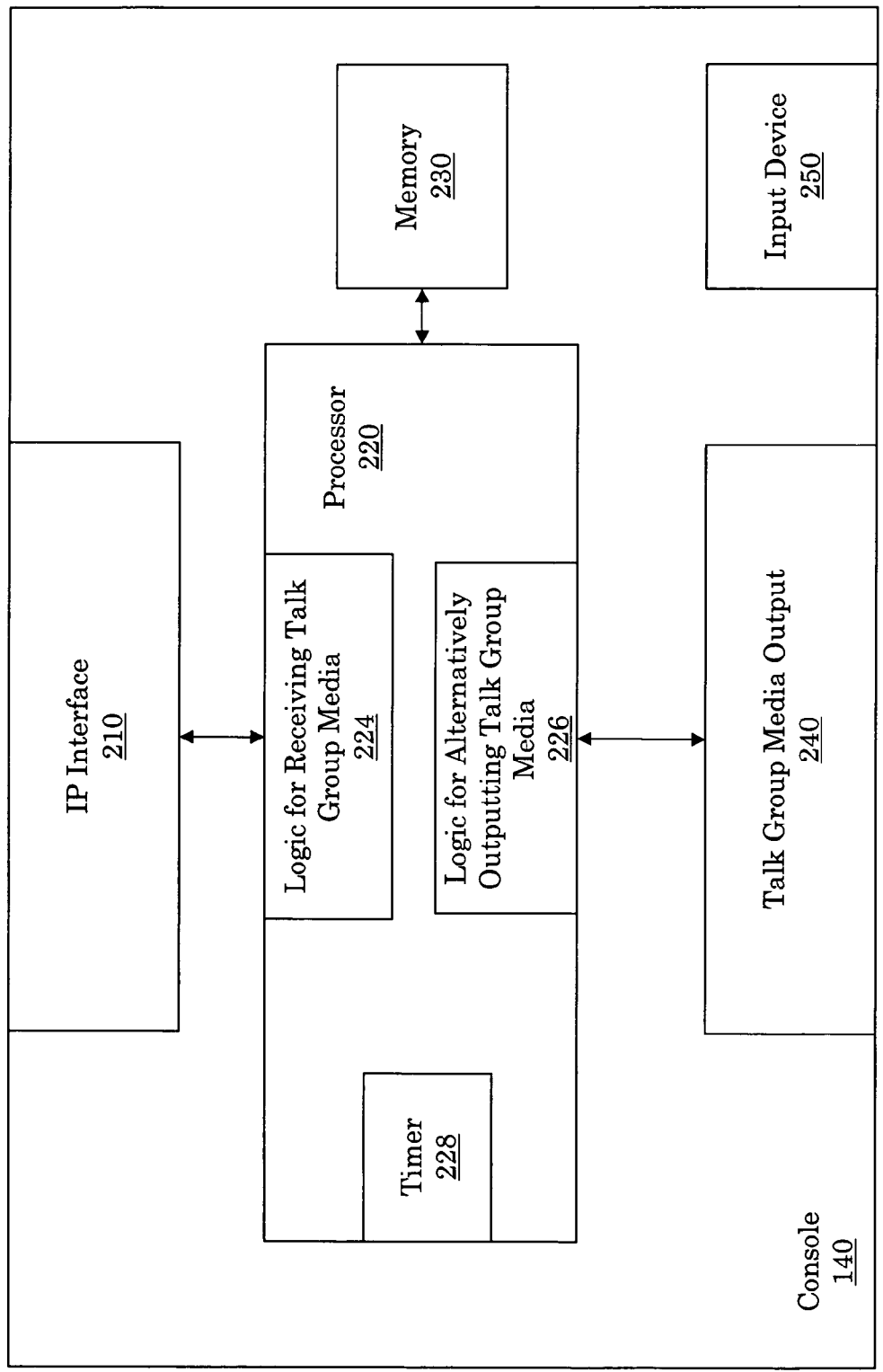
FIG. 2 illustrates an exemplary dispatch console in accordance with the present invention.

FIG. 2 illustrates an exemplary dispatch console 140 in accordance with the present invention. The dispatch console 140 includes an IP interface 210, processor 220, memory 230, talk group media output 240, and input 250. When the console 140 is a dedicated console, instead of IP interface 210, the console can include a non-IP interface. The IP interface 210 can be any type of IP interface, such as a Ethernet interface, a broadband modem, narrow-band modem, or the like. The processor can be a microprocessor, application specific integrated circuit (ASIC), field programmable gate-array (FPGA), or the like. The processor includes logic for receiving the talk group media 224 from IP interface 210, and logic for alternatively outputting the talk group media 226 to talk group media output 240.

The memory 230 can be random access memory (RAM), read only memory (ROM), a hard drive, flash memory, or the like. The memory 230 can include a software program, which when loaded by the processor 220, provides the processor with the functionality for receiving the talk group media and alternatively outputting the talk group media. The talk group media output 240 can be an audio speaker, a sound card, which interfaces with an audio speaker, or the like. The input 250 can be a keyboard, mouse, or the like, and is used for receiving commands for the operation of the console 200. Additionally, input 250 can be a microphone, which allows an operator of the console to communicate with the mobile stations. The operation of console 200 will be described in more detail below in connection with FIGS. 3 and 4.

Figure 3:
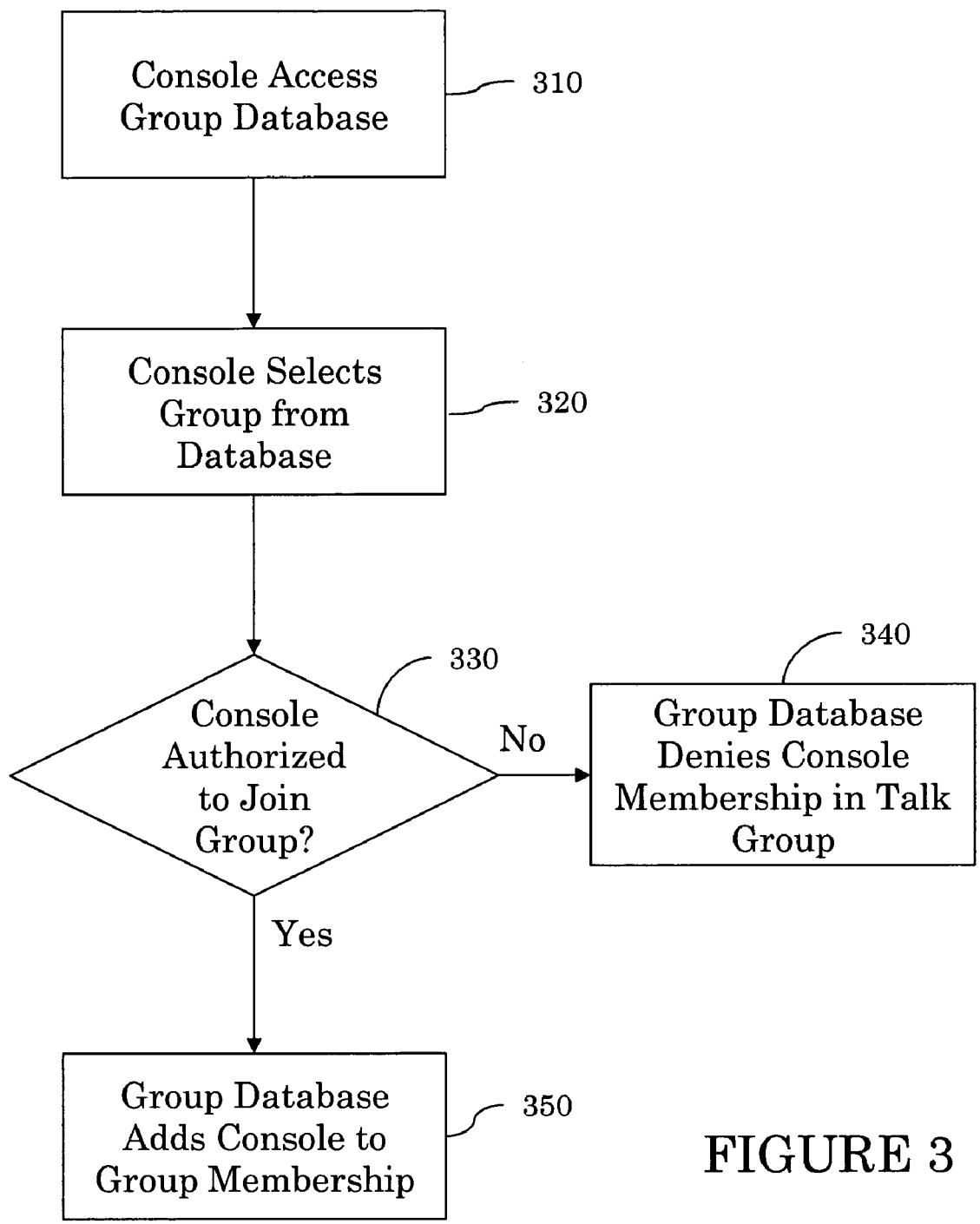
FIG. 3 illustrates an exemplary method for registering a console as a member of dispatch talk groups in accordance with the present invention.

FIG. 3 illustrates an exemplary method for registering a console as a member of dispatch talk groups in accordance with the present invention. The dispatch console 140 accesses group database 122 using IP interface 210 (step 310). The operator of the console 140 selects, using input device 250, a dispatch talk group to join from the group database 122 (step 320). The group database 122 determines whether the console is authorized to join the selected dispatch talk group (step 330). If the console is not authorized to join the selected dispatch talk group ("No" path out of decision step 330), then the group database 122 denies the console membership in the selected dispatch talk group (step 340). If, however, the console is authorized to join the selected dispatch talk group ("Yes" path out of decision step 330), then the group database 122 adds the console as a member of the selected dispatch talk group (step 350). The method of FIG. 3 is repeated for each dispatch talk group for which the console 140 desires to be a member.

Although FIG. 3 has been described as a console 140 selecting a single dispatch talk group, and the group database 122 responding to such a request, the console 140 can send a request to join a number of dispatch talk groups. The group database 122 will add the console 140 as a member of all of the requested groups for which the console 140 is authorized to join, and deny membership for those groups which the console 140 is not authorized to join. The group database 122 can then inform the console of which groups it was added as a member.

Using a single registration request to join a number of different dispatch talk groups would be particularly advantageous for public safety agencies for concentration of their console support when there is not expected to be high demands on the console operator. For example, at night, a single console can be authorized to be a member of different dispatch talk groups for public safety agencies with a similar public function, such as city, county and state police, or a number of different types of agencies, such as city police, fire and rescue departments, or any combination of the aforementioned agencies.

Figure 4:
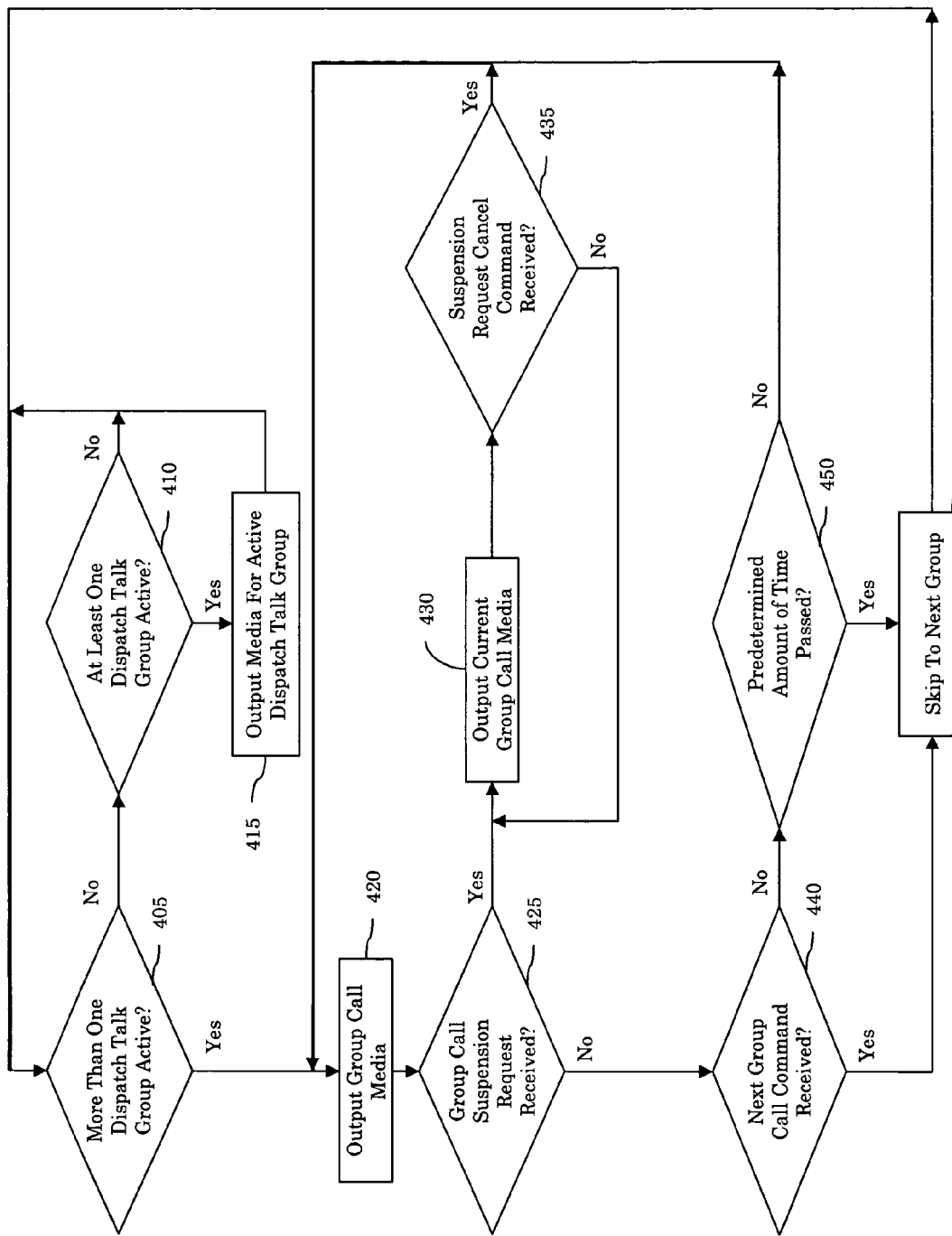
FIG. 4 illustrates an exemplary method for a console monitoring one or more talk group communications in accordance with the present invention.

FIG. 4 illustrates an exemplary method for a console monitoring one or more dispatch talk group communications in accordance with the present invention. The processor 220 (of console 140) determines whether more than one dispatch talk group, for which it is a member, is active (step 405). Typically, when a dispatch talk group is active, signaling and/or media will be forwarded to all members of the dispatch talk group. Additionally, some dispatch systems employ a hang timer, which maintains a dispatch talk group as an active talk group for a predetermined period of time between active speakers. Accordingly, the processor 220 can determine whether there are active dispatch talk groups based on the receipt of signaling and/or media information for a dispatch talk group, or based on whether there is an active hang timer for a dispatch talk group, which the processor 220 has previously received signaling and/or media.

If the processor 220 determines that not more than one talk group is active ("No" path out of decision step 405), then the processor determines whether at least one dispatch talk group is active (step 410). If the processor determines that at least one talk group is not active ("No" path out of decision step 410), then the processor continues to determine whether more than one dispatch talk group is active (step 410). If at least one dispatch talk group is active ("Yes" path out of decision step 410), then the processor outputs the media of the active dispatch talk group (step 415). The processor then continues to determine whether more than one dispatch talk group is active (step 405).

When the processor 220 determines that more than one dispatch talk group is active ("Yes" path out of decision step 405), the processor outputs, to talk group media output 240, the media for one of the active dispatch talk groups (step 420). The processor 220 then determines whether it has received, via input device 250, a group call suspension request (step 425). A group call suspension request prevents the console from advancing to the next active dispatch talk group, of the group of active dispatch talk groups.

If the processor receives a group call suspension request ("Yes" path out of decision step 425), then the processor 220 continues to output, to talk group media output 240, the current dispatch talk group call media (step 430). The processor 220 then determines whether it has received, via input device 250, a suspension request cancel command (step 435). If the processor 220 has not received a suspension request cancel command ("No" path out of decision step 435), then the processor 220 continues to output the current dispatch talk group call media (step 430). However, when the processor receives a suspension request cancel command ("Yes" path out of decision step 435), the processor 220 then exits the suspension state, but continues to output the current dispatch talk group call media (step 420).

If the processor does not receive a group call suspension command ("No" path out of decision step 425), or after the processor 220 has exited the suspension state ("Yes" path out of decision step 435), then the processor 220 determines whether it has received, via input device 250, a next group call command (step 440). A next group call command causes the console 140 to output the next active dispatch talk group, of the active dispatch talk groups for which the console is a member. If the processor has received a next group call command ("Yes" path out of decision step 440), then the processor skips to the next talk group (step 445), and outputs the media for the next talk group (step 420).

If the processor 220 has not received a next group call command ("No" path out of decision step 440), then the processor determines whether a predetermined amount of time has passed (step 450). The predetermined amount of time can be preprogrammed into the console 140, and/or can be configured by the user of the console. Moreover, the predetermined amount of time can be decreased by some factor as the number of active dispatch talk groups, for which the console is a member, increases. If a predetermined amount of time has not passed ("No" path out of decision step 450), then the processor continues to output the current group call media (step 420). If, however, the predetermined amount of time has passed ("Yes" path out of decision step 450), then the processor skips to the next dispatch talk group (step 445), and outputs the media for the next dispatch talk group (step 420).

Although the present invention has been described in connection with dispatch communications between mobile stations, the present invention is equally applicable to dispatch communications between any type of communication stations capable of dispatch communications.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A method for monitoring dispatch communications, the method comprising the acts of:
   receiving a first media stream for a first dispatch talk group communication;
   receiving a second media stream for a second dispatch talk group communication; and
   alternatively outputting the first and second media streams for a predetermined amount of time, wherein the first and second media streams are alternatively output automatically, and
   wherein two participants of the first or second dispatch talk group communications are supported by different dispatch call handlers.

2. The method of claim 1, further comprising the act of:
   temporarily suspending the alternative output in response to a suspension request, such that a media stream being output when the suspension request is received continues to be output.

3. The method of claim 2, further comprising the act of:
   resuming the alternate output in response to a cancellation of the suspension request.

4. The method of claim 1, wherein when the first media stream is currently being output, the method further comprising the act of:
   outputting the second media stream, irrespective of whether the predetermined amount of time has passed, in response to a next media stream request.

5. The method of claim 1, further comprising the act of:
   receiving a third media stream for a third dispatch talk group communication,
   wherein the act of alternatively outputting includes alternatively outputting the first, second and third media streams.

6. The method of claim 1, wherein the method is performed by a console, the method further comprising the acts of:
   accessing a dispatch talk group database; and
   adding the console as a participant of the first and second dispatch talk groups.

7. The method of claim 1, further comprising the act of:
   communicating, by an operator of a console, with the two participants.

8. The method of claim 1, wherein a dispatch communication console receives the first and second media streams and alternatively outputs the first and second media streams by way of a speaker of the dispatch communication console.

9. A dispatch communication console, comprising:
   an interface which receives a first media stream for a first dispatch talk group communication, and a second media stream for a second dispatch talk group communication; and
   a processor which alternatively outputs the first and second media streams for a predetermined amount of time, wherein the processor automatically alternatively outputs the first and second media streams, and wherein two participants of the first or second dispatch talk group communications are supported by different dispatch call handlers.

10. The dispatch communication console of claim 9, comprising:
an input device, wherein the processor temporarily suspends the alternative output when the processor receives a suspension request from the input device, such that the processor continues to output a media stream being output when the suspension request is received.

11. The dispatch communication console of claim 10, wherein the processor resumes the alternate output in response to receipt of a cancellation of the suspension request from the input device.

12. The dispatch communication console of claim 9, comprising:
an input device, wherein when the first media stream is currently being output and the processor receives a next media stream request from the input device, the processor outputs the second media stream, irrespective of whether the predetermined amount of time has passed.

13. The dispatch communication console of claim 9, wherein the processor receives a third media stream for a third dispatch talk group communication, and alternatively outputs the first, second and third media streams.

14. The dispatch communication console of claim 9, wherein the interface is coupled to a dispatch talk group database, and the interface allows the processor to access the dispatch talk group database, and add the console as a participant of the first and second dispatch talk groups.

15. The dispatch communication console of claim 9, comprising:
a speaker, coupled to the processor, that outputs the first and second media streams received from the processor.

16. A processor for a dispatch communication console, comprising:
logic for receiving a first media stream for a first dispatch talk group communication, and a second media stream for a second dispatch talk group communication; and
logic for alternatively outputting the first and second media streams for a predetermined amount of time, wherein the first and second media streams are output automatically, and
wherein two participants of the first or second dispatch talk group communications are supported by different dispatch call handlers.

17. The processor of claim 16, wherein the logic for alternatively outputting temporarily suspends the alternative output in response to a suspension request, such that logic for alternatively outputting continues to output a media stream being output when the suspension request is received.

18. The processor of claim 17, wherein the alternate output is resumed in response to receipt of a cancellation of the suspension request.

19. The processor of claim 16, wherein when the first media stream is currently being output and a next media stream request is received, the logic for alternatively outputting outputs the second media stream, irrespective of whether the predetermined amount of time has passed.

20. The processor of claim 16, wherein the logic for receiving receives a third media stream for a third dispatch talk group communication, and the logic for alternatively outputting alternatively outputs the first, second and third media streams.

21. The processor of claim 16, wherein the logic for alternatively outputting provides the first and second media streams to a speaker coupled to the processor.

* * * * *